US007657459B2

(12) United States Patent
Anderson et al.

(10) Patent No.: US 7,657,459 B2
(45) Date of Patent: Feb. 2, 2010

(54) TECHNIQUES FOR ACQUIRING A MEDIA SEASON OF DIGITAL MEDIA ASSETS

(75) Inventors: Alexandrea Anderson, Clovis, CA (US); Debbie Shimizu, San Jose, CA (US); Elizabeth d'Errico, Redwood City, CA (US); Robert Kondrk, San Jose, CA (US); Patrice Gautier, San Francisco, CA (US); Thomas Burkholder, Vancouver (CA); Colin Meldrum, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 681 days.

(21) Appl. No.: 11/370,347

(22) Filed: Mar. 7, 2006

(65) Prior Publication Data

US 2006/0248114 A1 Nov. 2, 2006

Related U.S. Application Data

(63) Continuation-in-part of application No. 11/247,948, filed on Oct. 10, 2005, which is a continuation-in-part of application No. 11/212,314, filed on Aug. 24, 2005.

(60) Provisional application No. 60/675,731, filed on Apr. 27, 2005.

(51) Int. Cl.
*G06Q 30/00* (2006.01)

(52) U.S. Cl. .......................................... 705/26; 705/37

(58) Field of Classification Search .................. 705/26, 705/37

See application file for complete search history.

(56) References Cited

U.S. PATENT DOCUMENTS 5,892,900 A * 4/1999 Ginter et al. .................. 726/26
2004/0268451 A1 12/2004 Robbin et al.
2005/0021478 A1 1/2005 Gautier et al.
2005/0050345 A1 3/2005 Dowdy et al.
2006/0247976 A1* 11/2006 Posokhow et al. ............ 705/26
2006/0248113 A1 11/2006 Leffert et al.
2009/0144153 A1* 6/2009 Kondrk et al. ................ 705/14

OTHER PUBLICATIONS

Brilliant-Tm- Digital Entertainment Launches Full Screen Multipath-Tm- Movie Webisodes On The Internet; Commences Retail Cd-Rom Distribution For Holiday Season, Business Editors. Business Wire. New York: Dec. 7, 1998. p. 1, Downloaded From Proquest On The Internet On Nov. 11, 2009, 6 Pages.*

"The iTunes Music Store. Downloads Done Right", www.apple.com/music/store, downloaded Sep. 24, 2003, pp. 1-3.

"Shop The First Online 99¢ Store", www.apple.com/music/store/shop.html, downloaded Sep. 24, 2003, pp. 1-2.

"Comcast Officially Kicks Off NFL Network and NFL Network On Demand", Press Release, Sep. 13, 2004, pp. 1-2.

"NFL Sunday Ticket Features", DIRECTV 2005, downloaded Feb. 13, 2006, www.directvsports.com/subscriptions/nflsundayticket/enhancements, pp. 1-3.

"NFL Sunday Ticket, Go Everywhere the Action Is!", DIRECTV 2005, downloaded Feb. 13, 2006, www.directvsports.com/subscriptions/nflsundayticket, pp. 1-3.

(Continued)

*Primary Examiner*—James Zurita

(57) ABSTRACT

Techniques to facilitate acquiring a media season, or a related series, of digital media assets from an on-line media store are disclosed. A user can view various media seasons that have been listed as available for purchase from the on-line media store. A user can choose to purchase a particular media season, either before or during the season. Subsequent to the purchase of the particular media season, digital media assets of the particular media season can be delivered to the user once the digital media assets become available. Since the monitoring is computerized and the delivery is electronic, once a digital media asset becomes available, delivery can be automatically processed.

32 Claims, 12 Drawing Sheets

OTHER PUBLICATIONS

Shopping Cart with Recommendations, Amazon.com, downloaded Apr. 27, 2005, pp. 1-4.

Book Search Results, Amazon.com, downloaded Apr. 27, 2005, pp. 1-11.

* cited by examiner

TECHNIQUES FOR ACQUIRING A MEDIA SEASON OF DIGITAL MEDIA ASSETS

CROSS-REFERENCE TO RELATED APPLICATIONS

This application is a continuation-in-part of U.S. patent application Ser. No. 11/247,948, filed Oct. 10, 2005, and entitled "ON-LINE MEDIA STORE THAT SUPPORTS PRE-ORDERING OF DIGITAL MEDIA ASSETS," which is hereby incorporated herein by reference, which is a continuation-in-part of U.S. patent application Ser. No. 11/212,314, filed Aug. 24, 2005, and entitled "ON-LINE MEDIA STORE THAT SUPPORTS PRE-ORDERING OF DIGITAL MEDIA ASSETS," which is hereby incorporated herein by reference, and which claims priority to U.S. Provisional Patent Application No. 60/675,731, filed Apr. 27, 2005, and entitled "ON-LINE MEDIA STORE THAT SUPPORTS PRE-ORDERING OF DIGITAL MEDIA ASSETS," which is hereby incorporated herein by reference.

This application also claims priority to U.S. Provisional Patent Application No. 60/675,731, filed Apr. 27, 2005, and entitled "ON-LINE MEDIA STORE THAT SUPPORTS PRE-ORDERING OF DIGITAL MEDIA ASSETS," which is hereby incorporated herein by reference.

This application is also related to: (i) U.S. patent application Ser. No. 10/833,267, filed Apr. 26, 2004, and entitled "METHOD AND SYSTEM FOR NETWORK-BASED PURCHASE AND DISTRIBUTION OF MEDIA," which is hereby incorporated herein by reference; and (ii) U.S. patent application Ser. No. 10/687,534, filed Oct. 15, 2003, and entitled "METHOD AND SYSTEM FOR SUBMITTING MEDIA FOR NETWORK-BASED PURCHASE AND DISTRIBUTION," which is hereby incorporated herein by reference.

BACKGROUND OF THE INVENTION

1. Field of the Invention

The present invention relates to digital media assets and, more particularly, to network-based purchase of sets of digital media assets.

2. Description of the Related Art

Television shows are recorded and then scheduled for broadcast to viewers over cable or airwaves. Often the television shows are daily or weekly programs. As such, in a given season of television shows, many shows will provide a number of different episodes that are broadcast over the course of the season. Users can receive and view the shows at the specific times of their broadcast. However, after the episodes have been broadcasted, the episodes are not readily available, unless a user has recorded the broadcast onto a tape (e.g., VHS tape), DVD or data storage drive (e.g., TIVO). Occasionally, a previously broadcasted episode of a show will be re-broadcast (known as a "re-run"). After a season is over, a media company owning rights in a television show may package the various episodes of a show onto a DVD and offer the DVD for sale at retail stores. For example, an entire season of episodes of a particular television show can be provided on a DVD and sold.

Recently, videos have become available for download from media servers located on the Internet. Unfortunately, when a video pertains to a show that has a season of episodes, the user has to access, locate and download each of the episodes for the show. This is time consuming and burdensome on the user, particularly since the episodes are released over the course of the season. Thus, there is a need for improved approaches to acquiring a season of shows from an on-line media source.

SUMMARY OF THE INVENTION

The invention pertains to acquiring a media season, or a related series, of digital media assets. The digital media assets are electronically delivered, such as from an on-line media store. A user can view various media seasons that have been listed as available for purchase from the on-line media store. A user can choose to purchase a particular media season, either before or during the season. Subsequent to the purchase of the particular media season, digital media assets of the particular media season can be delivered to the user once the digital media assets become available. Since the monitoring is computerized and the delivery is electronic, once a digital media asset becomes available, delivery can be automatically processed.

According to one aspect of the invention, a season, or related series, of digital media assets can be purchased as a set. Often, the set can be purchased at a lower price than would be charged if the digital media assets were individually purchased. Typically, none or some but not all of the digital media assets of the set are available at the time of purchase. Consequently, as the digital media assets become available, they are associated with the set and can be delivered to the user.

In one embodiment, the digital media assets of a particular media season, or related season, are episodes of a show, such as a television show or event. The episodes, in one example, are audiovisual media content, such as video content.

The invention can be implemented in numerous ways, including as a method, system, device, apparatus (including graphical user interface), or computer readable medium. Several embodiments of the invention are discussed below.

As a method for acquiring a related series of digital media assets from an on-line media store, one embodiment of the invention includes at least the acts of: presenting a plurality of related series of digital media assets that are available for purchase on the on-line media store; receiving a selection of one of the related series of digital media assets to be purchased; initiating purchase of the selected one of the related series of digital media assets; and permitting delivery of available ones of the digital media assets of the selected one of the related series of digital media assets.

As a computer readable medium including at least computer program code for acquiring a related series of digital media assets from an on-line media store, one embodiment of the invention includes at least: computer program code for presenting a plurality of related series of digital media assets that are available for purchase on the on-line media store; computer program code for receiving a selection of one of the related series of digital media assets to be purchased; computer program code for initiating purchase of the selected one of the related series of digital media assets; and computer program code for permitting delivery of available ones of the digital media assets of the selected one of the related series of digital media assets.

As a media server, one embodiment includes at least one data storage device and a data processing unit. The at least one data storage device stores (i) season product information that contains characteristics on a plurality of related series, (ii) related series information, the related series object relates a plurality of episodes to each of the plurality of related series, and (iii) the plurality of episodes or pointers thereto. The data processing unit performs a purchase process to enable users to select one or more of the related series for purchase, and a fulfillment process to deliver, to the user that has purchased such, the episodes for the purchased one of more of the related series as they become available.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to acquiring a media season, or a related series, of digital media assets. The digital media assets are electronically delivered, such as from an on-line media store. A user can view various media seasons that have been listed as available for purchase from the on-line media store. A user can choose to purchase a particular media season, either before or during the season. Subsequent to the purchase of the particular media season, digital media assets of the particular media season can be delivered to the user once the digital media assets become available. Since the monitoring is computerized and the delivery is electronic, once a digital media asset becomes available, delivery can be automatically processed.

According to one aspect of the invention, a season, or related series, of digital media assets can be purchased as a set. Often, the set can be purchased at a lower price than would be charged if the digital media assets were individually purchased. Typically, none or some but not all of the digital media assets of the set are available at the time of purchase. Consequently, as the digital media assets become available, they are associated with the set and can be delivered to the user.

In one embodiment, the digital media assets of a particular media season, or related season, are episodes of a show, such as a television show or event. The episodes, in one example, are audiovisual media content, such as video content.

Embodiments of the invention are discussed below with reference to FIGS. 1-8. However, those skilled in the art will readily appreciate that the detailed description given herein with respect to these figures is for explanatory purposes as the invention extends beyond these limited embodiments.

The invention pertains to a system and method for acquiring a season of digital media assets over a network. A potential purchaser can search and browse through numerous seasons of digital media assets that are available for purchase. A potential purchaser can purchase a season of digital media assets, including numerous episodes, with a single transaction. Upon purchasing a season, as the digital media assets become available, they are made available to the purchaser. A season of digital media assets can correspond to a show or event. The digital media assets can also be referred to as episodes. Regardless, the digital media assets can pertain to audiovisual content, such as videos or movies.

Figure 1:
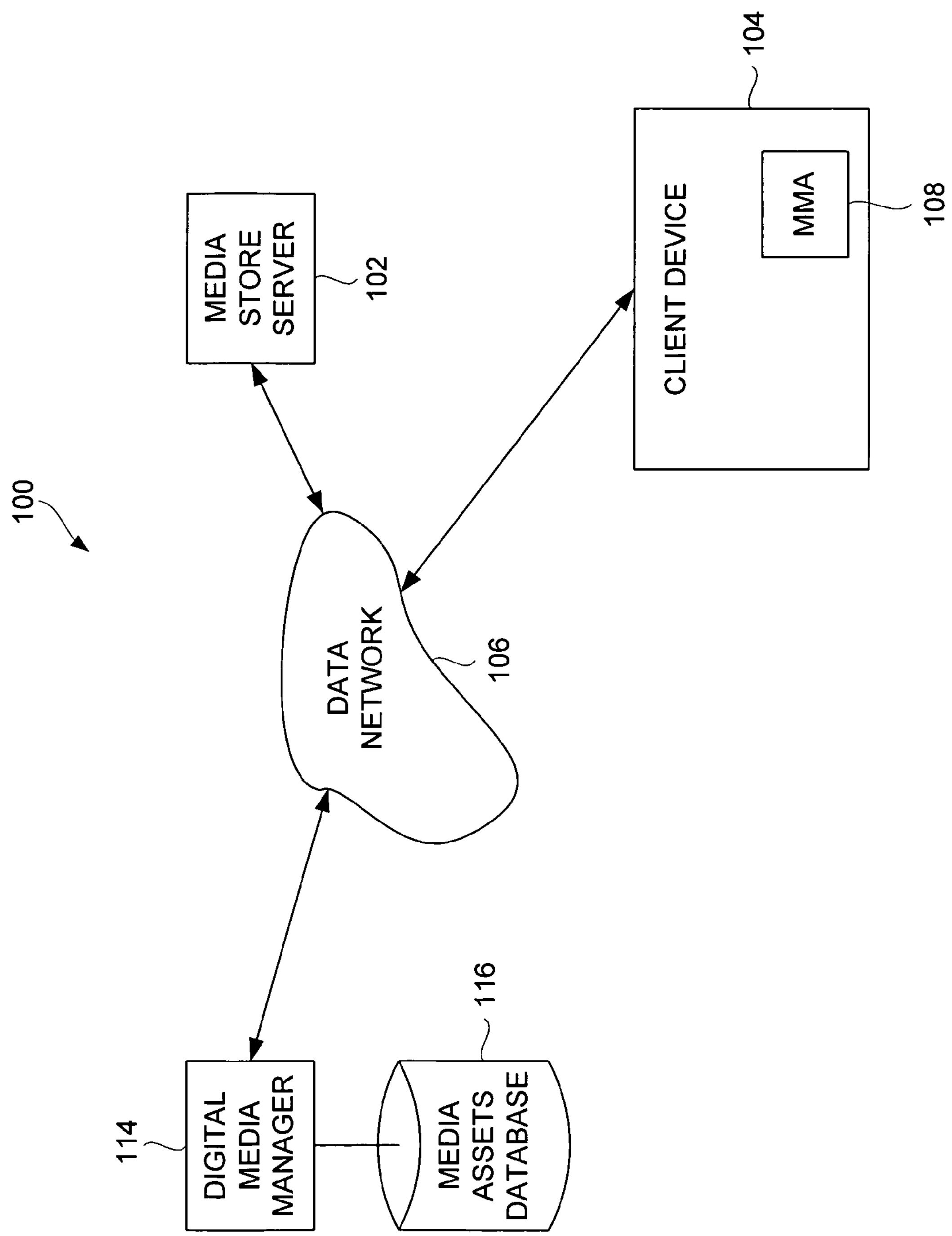
FIG. 1 is a block diagram of a media purchase system according to one embodiment of the invention.

FIG. 1 is a block diagram of a media purchase system 100 according to one embodiment of the invention. The media purchase system 100 includes a media store server 102 that hosts an on-line media store. The media store server 102 can off-load commerce transactions and/or delivery of purchased digital media assets to other servers, if desired. As shown in FIG. 1, the media purchase system 100 includes one or more client devices 104 for use by end users. The client devices 104 couple to a data network 106. Additionally, the media store server 102 also couples to the data network 106. In one implementation, the data network 106 can refer to one or more data networks, typically, high data-bandwidth networks, namely, wired networks, such as the Internet, Ethernet, gigabit Ethernet, and fiber optic, as well as wireless networks such as IEEE 802.11(a), (b) or (g) (WiFi), IEEE 802.16 (WiMax), and Ultra-Wide Band (UWB).

A computer program 108, typically a media management application (MMA) or other media player application, runs on the client device 104. One example of a media management application is the iTunes® application, produced by Apple Computer, Inc. of Cupertino, Calif. The client devices 104 are, in general, computing devices. As an example, the client devices 104 can be specific or general-purpose personal computers or portable media players. One example of a portable media player suitable for use with the invention is the iPod® media player, also produced by Apple Computer, Inc. The computer program 108 can be used by a consumer for a variety of purposes, including, but not limited to: (i) browsing and/or purchasing media assets (including seasons of media assets) from the on-line media store provided by the media store server 102, (ii) creating and sharing media asset groups (e.g., playlists), (iii) organizing media assets, (iv) presenting/playing media assets, and (v) transferring media assets between client devices 104.

The media purchase system 100 can also include a digital asset manager 114. The digital asset manager 114 is coupled to a media assets database 116. The media assets database 116 stores media asset information including metadata relating to digital media assets available for purchase at the on-line media store. In one embodiment, the digital asset manager 114 can control what media assets and media asset information are available on the on-line media store. The metadata can pertain to individual media assets (digital media assets) or media asset groups (digital media asset groups). One type of group of digital media assets is a season or a series of media assets. Media assets can include, but are not limited to, video, music, text, and/or graphics files.

The media store server 102 enables the user of a particular client device 104 to purchase a set (e.g., season or series) of media assets (e.g., videos or songs) through on-line transactions. On-line transactions to purchase media items are also referred to as electronic commerce (e-commerce). Subsequently, the client device 104 can download the purchased media assets from the media store server 102, or some other server, via the data network 106. As will be understood by those familiar with data networks, other network configurations are possible. Furthermore, while the media store server 102 and the digital asset manager 114 are shown as individual and separate devices, it will be understood by those familiar with the art that other configurations are possible. As one example, each device can be implemented such that it is distributed over multiple server computers. As another example, these various servers and/or managers can be implemented by a single physical server computer.

Figure 2A:
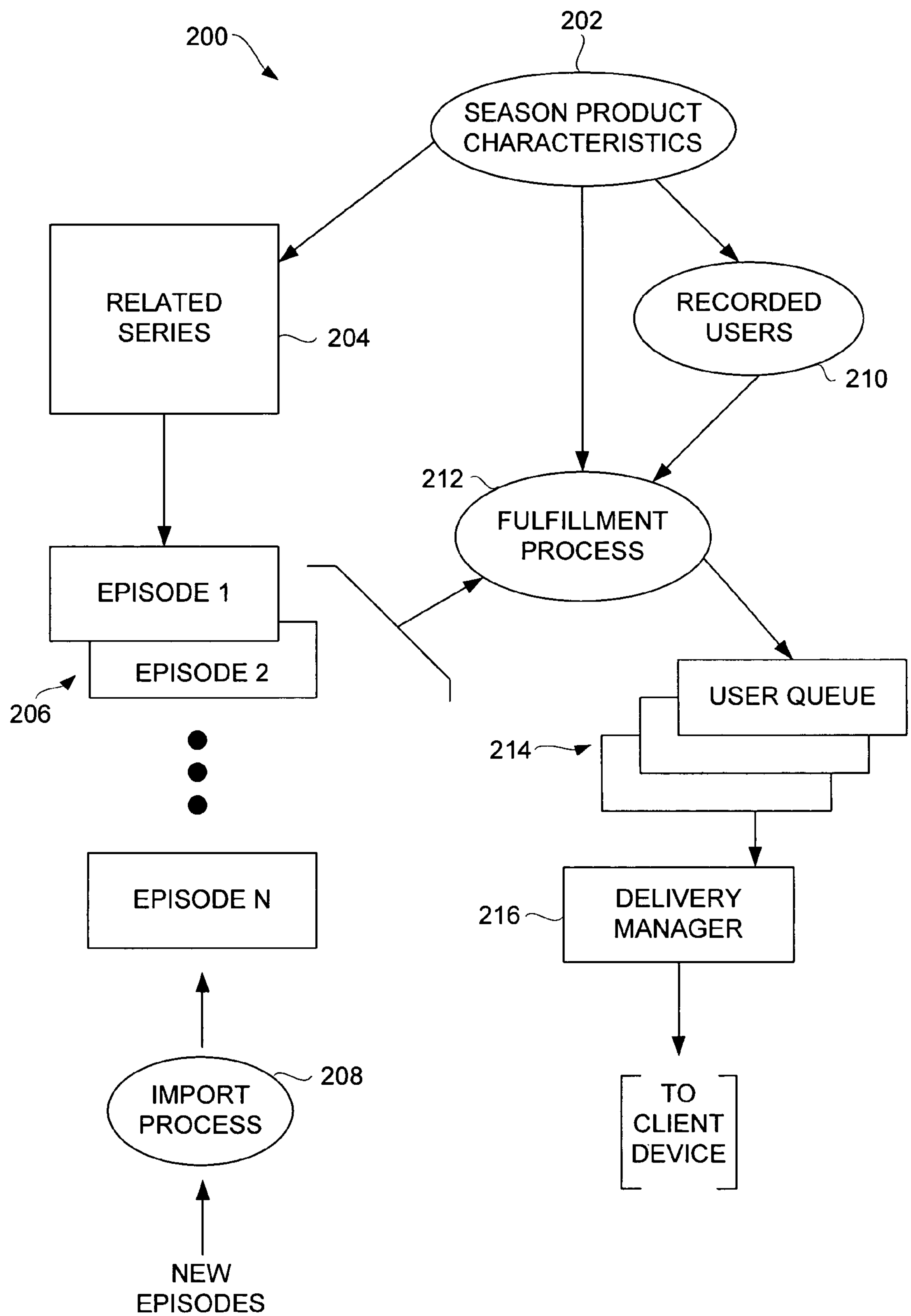
FIG. 2A is a diagram of a media season management system according to one embodiment of the invention.

FIG. 2A is a diagram of a media season management system 200 according to one embodiment of the invention. The media season management system 200 can be provided by the media store server 102 illustrated in FIG. 1 or some other server associated therewith.

The media season management system 200 includes season product characteristics 202 for a plurality of media seasons. The season product characteristics 202 describe attributes of the media seasons which are made available and managed by the media season management system 200. For example, the attributes of a media season can include title, price, type, start and end dates, number of expected episodes, countries of distribution, etc. Each of the seasons has a related series of episodes associated therewith. For example, a particular media season has an associated related series 204. The related series 204 pertains to a group of episodes 206 that are associated with the particular media season. For example, the media season can pertain to a television show, and thus the related series 204 includes a plurality of episodes that pertain to the television show in the given media season. As another example, the media season can pertain to an event, such as a sporting event, and thus the related series 204 includes a plurality of episodes that pertain to the event in the given media season. Typically, the episodes of a series or media season are developed over the length of the season. For example, some related series have new episodes weekly, others have new episodes daily, etc. As these new episodes become available from content providers, the new episodes can be imported into the media season management system 200 by an import process 208. The import process 208 is automated such that the electronic delivery of new episodes can be automatically placed in the appropriate related series 204 as additional episodes 206 pertaining to a particular media season. To assist with the automatic import process 208, the new episodes contain metadata that describes certain characteristics of the new episodes. For example, the metadata can indicate the season or related series (i.e., title) and episode number for the new episode.

The media season management system 200 also maintains recorded users 210. The recorded users are those users that are recorded as having access to a season product. Typically, a user will become a recorded user when the user purchases access to a particular media season. The recorded users 210 are thus associated with the particular media season that they have permission to access. The recorded users 210 can also indicate one or more preferences they have regarding fulfillment of their access to the media seasons.

The media season management system 200 also includes a fulfillment process 212. The fulfillment process 212 operates to recognize the presence of new episodes 206 and then determines if there are any recorded users 210 that are to be notified about the presence of a new episode regarding a particular media season that they have permission to access. When the fulfillment process 212 determines that a particular user is to be provided with a new episode 206, then the fulfillment process 212 can provide the new episode 206 to a user queue 214 associated with the particular user.

The media season management system 200 also includes a delivery manager 216. The delivery manager 216 operates to assist with the delivery of the new episodes from the user queues 214 to the corresponding client devices. For example, the delivery manager 216 can electronically deliver (e.g., download) the new episodes from the appropriate user queue 214 to the corresponding client device when requested by a user or automatically upon accessing an on-line media store that incorporates or couples to the media season management system 200. In addition, in one embodiment, the fulfillment process 212 could initiate or provide an email notification to the particular user that the new episode is now available to be acquired (e.g., downloaded) by the particular user.

Figure 2B:
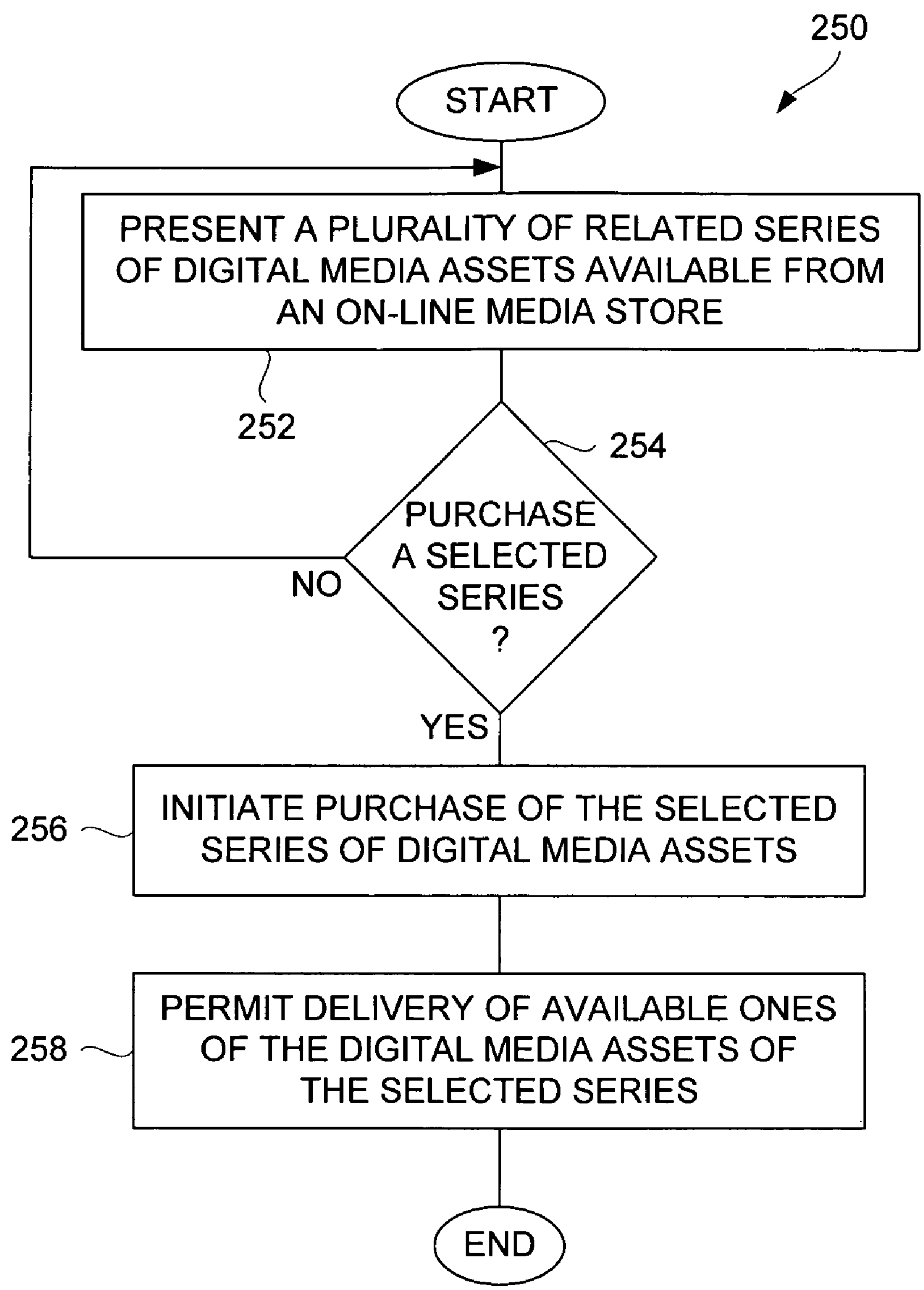
FIG. 2B is a flow diagram of a media series acquisition process according to one embodiment of the invention.

FIG. 2B is a flow diagram of a media series acquisition process 250 according to one embodiment of the invention. The media series acquisition process 250 can be associated with a media store server that provides or supports an on-line media store. For example, the media series acquisition process 250 can be associated with the media store server 102 illustrated in FIG. 1.

The media series acquisition process 250 initially presents 252 a plurality of related series of digital media assets available from an on-line media store. The related series of digital media assets can pertain to a media season, such as a media season for a particular show or event. For example, the media season can pertain to the 2005 media season for the television show "24". As another example, the media season can pertain to the 2005 National Football League (NFL) season, namely, all games, highlights, or commentary. The presenting 252 of the plurality of related series is typically presented on a display device of a client device associated with a user. The user typically interacts with the client device so as to browse, search or otherwise navigate an on-line media store to review different available related series. At some point, the user can opt to purchase one of the plurality of related series that are being presented 252. Hence, a decision 254 determines whether a selected series is to be purchased. When the decision 254 determines that a selected series is not to be purchased, the media series acquisition process 250 can return to repeat the block 252 so that the user can continue to review the available related series. On the other hand, when the decision 254 determines that a related series is to be purchased, purchase of the selected series of digital media assets is initiated 256. The processing of the purchase can be performed immediately or can be deferred or can be partially performed. In one embodiment, the purchase price for the selected series of digital media assets is not completely charged or otherwise imposed on the purchaser at the time of initial purchase. Instead, the purchase price can be prorated over the episodes associated with the selected series. In any case, after the purchase of the selected series of digital media assets has been at least initiated 256, delivery of available ones of the digital media assets of the selected series can be permitted 258. When the delivery of the available ones of the digital media assets is permitted 258, the purchaser (user) is able to gain access to the available digital media assets. For example, the available digital media assets might immediately be downloaded to the client device associated with the purchaser, or the available digital media assets can be downloaded at a later point in time when more convenient for the purchaser. Following the block 258, the media series acquisition process 250 ends.

Figure 3A:
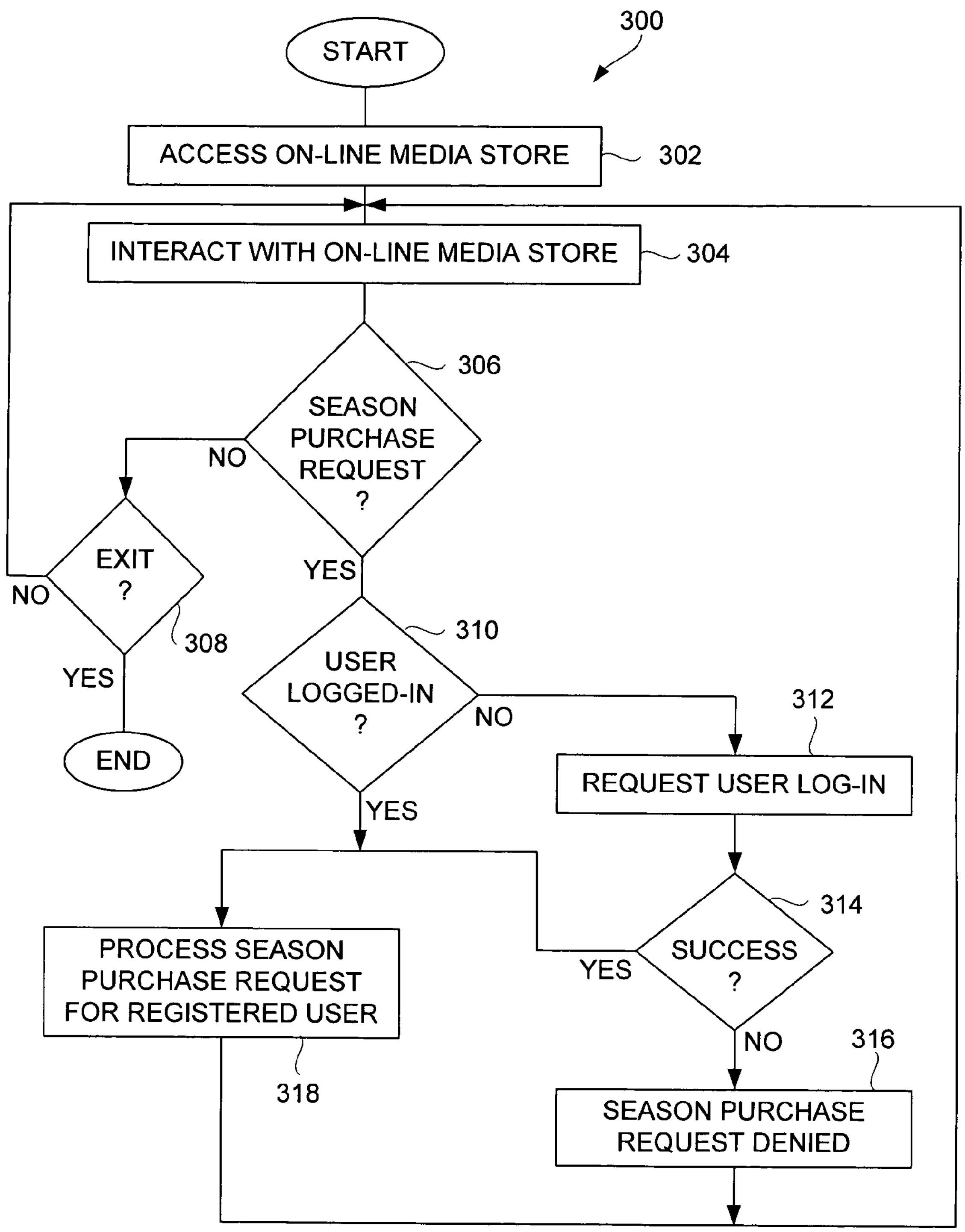
FIG. 3A is a flow diagram of a season purchase request process according to one embodiment of the invention.

FIG. 3A is a flow diagram of a season purchase request process 300 according to one embodiment of the invention. The season purchase request process 300 begins with access 302 to an on-line media store. Typically, a user will access 302 the on-line media store via a data network, such as the Internet. Once the user has accessed 302 the on-line media store, the user can interact 304 with the on-line media store. The interaction 304 with the on-line media store can, for example, involve searching, browsing, displaying, previewing, purchasing, and/or organizing digital media assets. Although the season purchase request process 300 is primarily provided by a server, such as the media store server 102 illustrated in FIG. 1, the access 302 and the interaction 304 can be facilitated by a media management application operating on a client device, such as the client device 104 illustrated in FIG. 1.

Next, a decision 306 determines whether a season purchase request has been received. When the decision 306 determines that a season purchase request has not been received, a decision 308 determines whether the season purchase request process 300 should be exited. When the decision 308 determines that the season purchase request process 300 should not be exited, then the season purchase request process 300 returns to repeat the operation 304 and subsequent operations. Alternatively, when the decision 306 determines that the season purchase request process 300 should exit, then the season purchase request process 300 ends. In one embodiment, when media store content for a season is displayed by the on-line media store, a "season purchase" control (e.g., button) can be presented to the user. By selection of the "season purchase" control, the user can initiate a season purchase request.

On the other hand, when the decision 306 determines that a season purchase request has been received, then a decision 310 determines whether the user is logged-in to the on-line media store. When the decision 310 determines that the user is not currently logged-in to the on-line media store, a user login is requested 312. A decision 314 then determines whether the login has been successful. As an example, the user will submit login information, such as a user name and/or password, which is evaluated to determine whether the user is permitted to login. When the decision 314 determines that login was not successful, the season purchase request is denied 316. Alternatively, when the decision 310 determines that the user is already logged-in, or when the decision 314 determines that the user has just successfully logged-in, the season purchase for a particular season of digital media assets is processed 318 for the registered user. For example, the season purchase can be purchased such that it is associated with the registered user (e.g., associated with the user account for the registered user) so that the registered user is able to acquire the various digital media assets within the particular season that has been purchased. Following the operation 316 or 318, the season purchase request process 300 returns to repeat the operation 304 and subsequent operations so that additional interaction 304 with the on-line media store is permitted, including making additional season purchase requests if so desired.

Figure 3B:
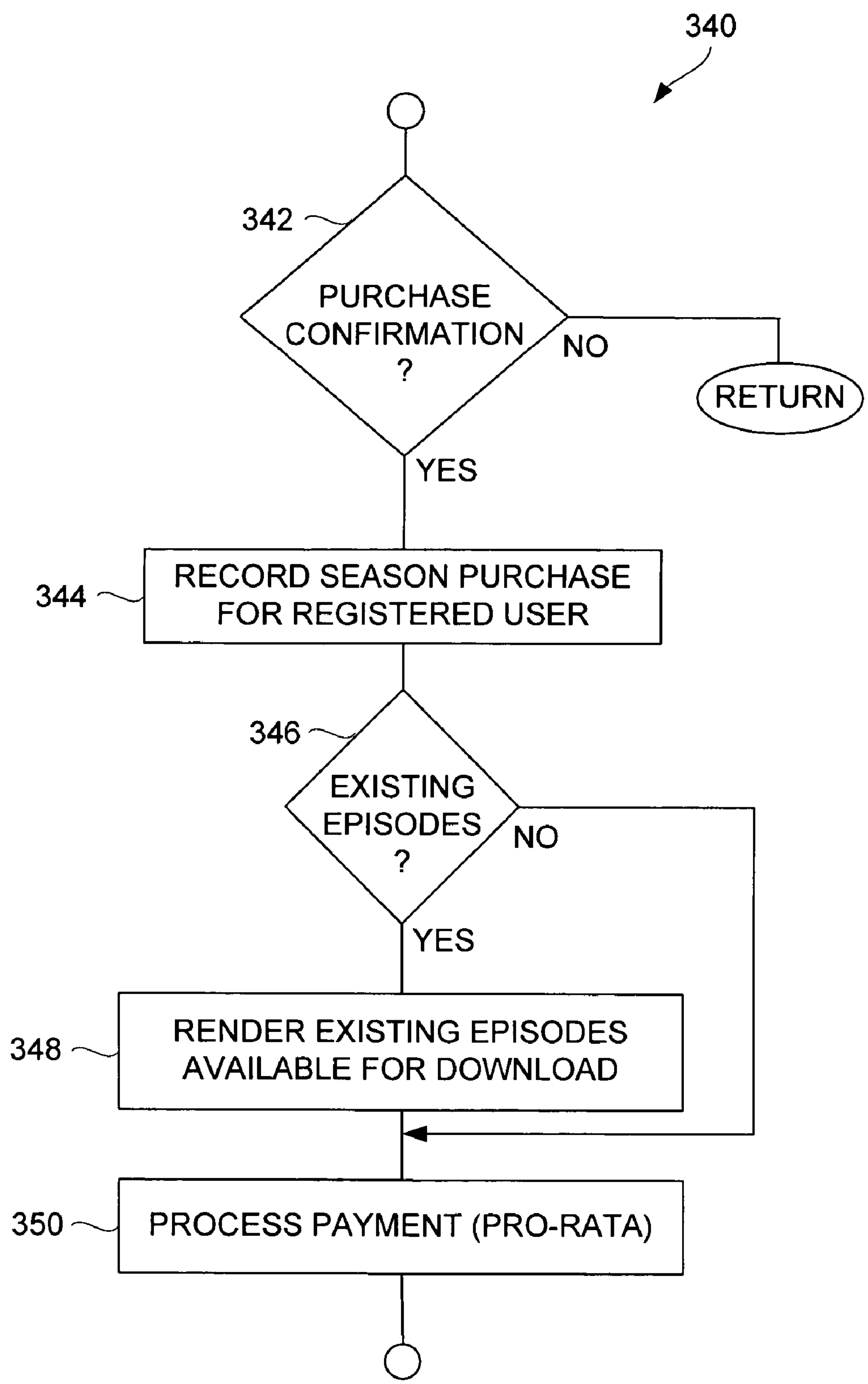
FIG. 3B is a flow diagram of a season purchase process according to one embodiment of the invention.

FIG. 3B is a flow diagram of a season purchase process 340 according to one embodiment of the invention. The season purchase process 340 is, for example, processing suitable for being performed by the block 318 of the season purchase request process 300 illustrated in FIG. 3A.

The season purchase process 340 begins with a decision 342. The decision 342 determines whether the purchaser (user) has confirmed purchase of the particular season being purchased. The season can also be referred to as a media season. When the decision 342 determines that the user has not confirmed purchase of the media season, then the season purchase process 340 returns back to the block 304 illustrated in FIG. 3A, thereby undoing the previous season purchase request.

On the other hand, when the decision 342 determines that the user has confirmed purchase of the particular season, the season purchase for the registered user is recorded 344. For example, the season purchase can be recorded 344 in the recorded users 210 of the media season management system 200 illustrated in FIG. 2A.

After the season purchase for the registered user has been recorded 344, a decision 346 determines whether there are existing episodes for the media season that has been purchased. When the decision 346 determines that there are existing episodes, then the existing episodes are rendered 348 available for download. This permits the registered user to acquire the existing episodes at or soon after the time of purchase of the media season. Payment for the media season is also processed 350. Typically, the payment is processed such that only a portion of the total cost of the media season is initially imposed or charged to the registered user. In other words, the total cost for the media season can be pro-rated with respect to the percentage of existing episodes that are initially available as compared to the total number of episodes expected to be provided during the media season. Following the block 350, the season purchase process 340 ends and processing can return to block 304 of the season purchase request process 300 illustrated in FIG. 3A so that the user can continue to interact with the on-line media store for various operations, including again purchasing a media season.

Although the season purchase process 340 permits the registered user to acquire the existing episodes at or soon after the time of purchase of the media season, in some embodiments there are no prior episodes to be delivered. For example, if the media season has not yet started, there are no episodes.

A media season can include all episodes of a show or event corresponding to a particular media season. A media season can consist of a predetermined number of consecutive episodes of a show or event. For example, the media season being purchased can be defined as forward looking, meaning that only a current episode and future episodes are contained in the media season for the registered user. Consequently, different registered users can get a different set of episodes depending on when they purchase the media season. A media season can include episodes containing audiovisual content regarding highlights of one or more events, shows, or programs. For example, the media season can be audiovisual highlights for a particular sporting event.

Figure 3C:
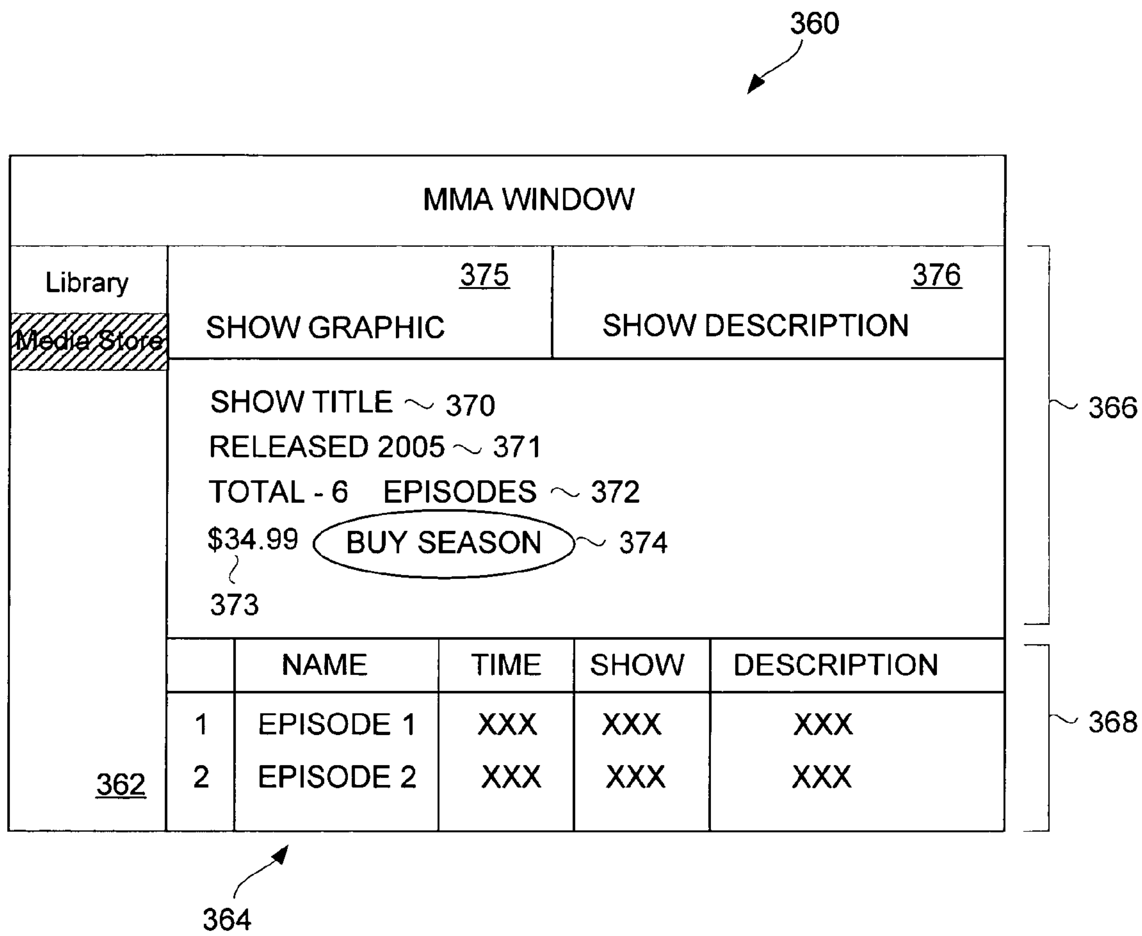
FIG. 3C is a diagram of a representative media season window according to one embodiment of the invention.

FIG. 3C is a diagram of a representative media season window 360 according to one embodiment of the invention. The media season window 360 is typically presented on a display device associated with a client device when the client device is interacting with the on-line media store via a Media Management Application (MMA). More particularly, when the user is interacting with the on-line media store to view information pertaining to a media season (or season pass) that is available for purchase on the on-line media store. The media season window 360 includes a source portion 362 and a media season portion 364. The source portion 362 indicates the source for the information being presented in the media season portion 364. In this example, the source portion 362 indicates that a "Media Store" has been selected, such that the information being presented in the media season portion 364 is information provided by an on-line media store. In this case, the information corresponds to one of a plurality of media seasons that are available for purchase from the on-line media store. The media season portion 364 includes a media season information portion 366 and an episode listing area 368. The media season information portion 366 includes information pertaining to the media season, which in this implementation is referred to as a show. Hence, the media season information portion 366 includes a show title 370, a release date 371, total number of episodes 372 for the show, total cost 373 for the media season, and a "Buy Season" button 374. Upon selecting the "Buy Season" button 374, the user requests to purchase the particular media season. The media season information area 366 can also display a show graphic 375 and a show description 376 for the media season. The show graphic 375, for example, is a still graphic, animated graphics or video associated with the media season. The show description 376 details the specifics of the media season (e.g., show) being purchased, including how many episodes are to be provided.

The episode listing area 368 illustrates those of the episodes that are currently available for the associated media season being described in the media season information area 366. In this example, the episode listing area 368 indicates the presence of two episodes, namely, "Episode 1" and "Episode 2." For each of the available episodes listed in the episode listing area, the name, time (duration), show and description for such episodes can be displayed in the episode listing area 368.

Figure 3D:
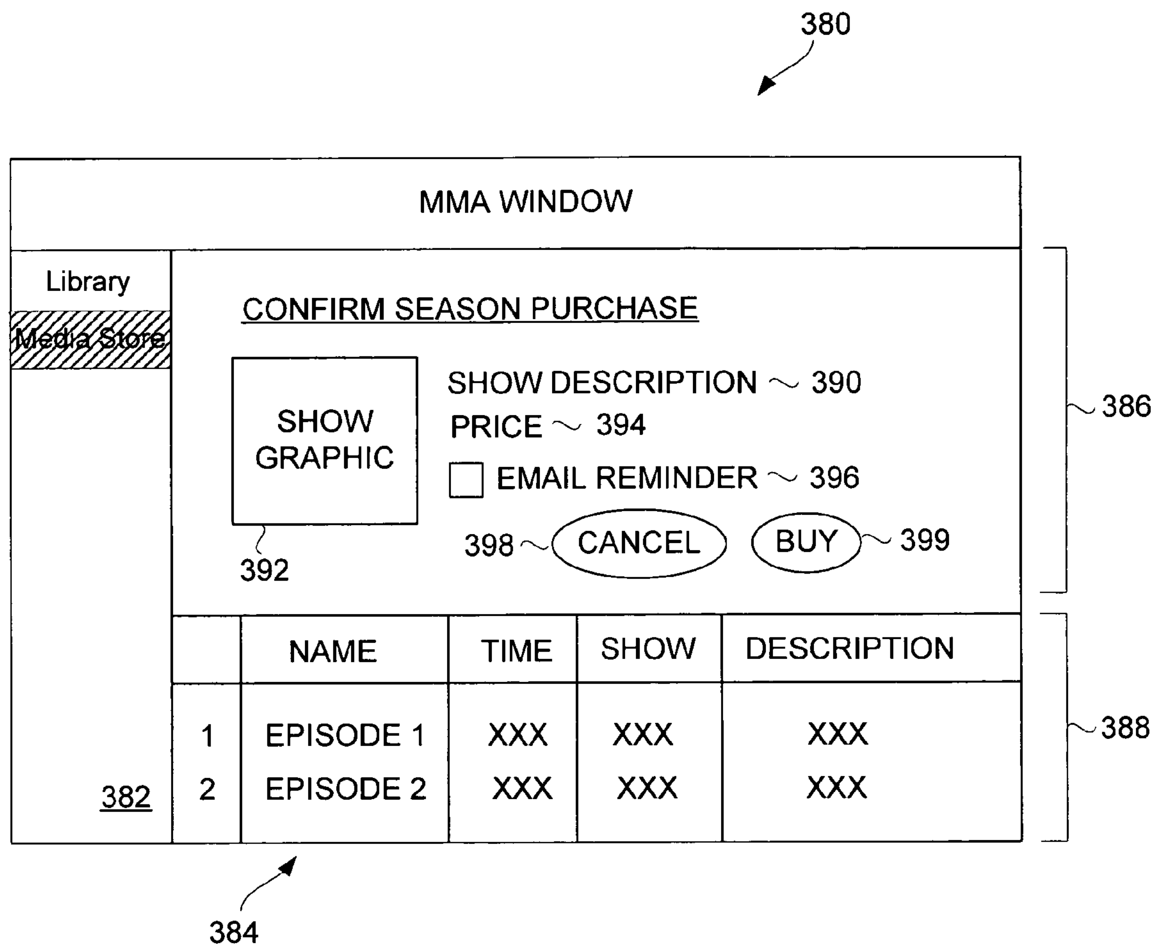
FIG. 3D is a representative season purchase confirmation window according to one embodiment of the invention.

FIG. 3D is a representative season purchase confirmation window 380 according to one embodiment of the invention. The season purchase confirmation window 380 can be presented to a user after the user has initially requested to buy a particular media season. For example, the user can select the buy season button 374 illustrated in FIG. 3C, and then be presented with the season purchase confirmation window 380.

The season purchase confirmation window 380 includes a media source portion 382 and a media season portion 384. The media source portion 382 indicates that a "Media Store" source has been selected, such that the media season portion 384 is displaying information provided by an on-line media store. The media season portion 384 includes a confirmation area 386 and an episode listing area 388. The episode listing area 388 is similar to the episode listing area 368 illustrated in FIG. 3C. The confirmation area 386 provides information to the user so that the user can confirm purchase of the media season. Here, in this implementation, the media season pertains to a show. The confirmation information area 368 includes a show description 390, a show graphic 392, and a show price 394. In addition, an email reminder regarding new episodes can be enabled or disabled as desired by the user through use of a user interface control (e.g., check-box) 396. Further, the media confirmation area 386 includes a "Cancel" button 398 and a "Buy" button 399. In the event that the user elects to not confirm the media season purchase, the user selects the "Cancel" button 398. On the other hand, if the user desires to confirm the purchase of the media season, the user selects the "Buy" button 399.

Figure 4:
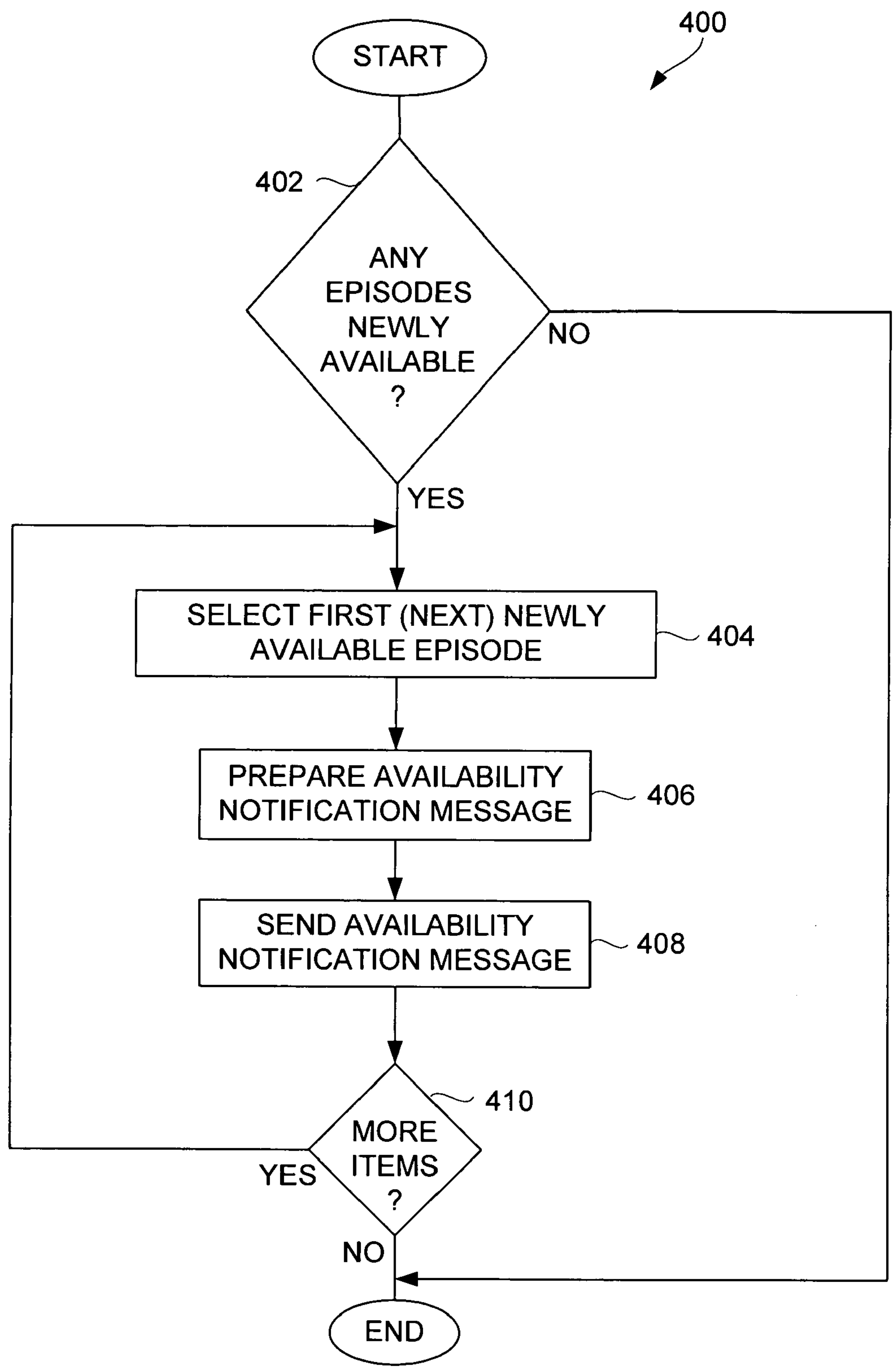
FIG. 4 is a flow diagram of an episode notification process according to one embodiment of the invention.

FIG. 4 is a flow diagram of an episode notification process 400 according to one embodiment of the invention. The episode notification process 400 begins with a decision 402. The decision 402 determines whether any episodes are newly available. Here, the decision 402 determines whether any episodes have recently been made available on the on-line media store such that they can now be delivered to requesting users. Typically, the episodes are associated with shows (e.g., television shows) or events (e.g., sporting events) that have been broadcast. Soon after a show is broadcast, the digital media content can be made available to the on-line media store so that the episode can be made available to those users that have purchased the corresponding media season.

When the decision 402 determines that there are episodes that are newly available, the episode notification process 400 performs processing operations for each of the episodes that are now newly available. In particular, a first newly available episode is selected 404. Next, an availability notification message is prepared 406. The availability notification message is then sent 408 to the appropriate users that have purchased the media season for which the episode pertains. As an example, the availability notification message can be implemented as an electronic mail (email) message. However, as noted in FIG. 3D, the purchaser can enable or disable receiving of notification messages (e.g., using a user interface control 396).

Following the operation 408, the episode notification process 400 determines at decision 410 whether more episodes are to be processed. In other words, when the decision 410 determines that there are other newly available episodes to be processed, the episode notification process 400 returns to repeat the operation 404 so that a next newly available episode can be similarly processed. Alternatively, when the decision 410 determines that there are no more other newly available episodes to be processed, the episode notification process 400 is complete and ends.

Figure 5:
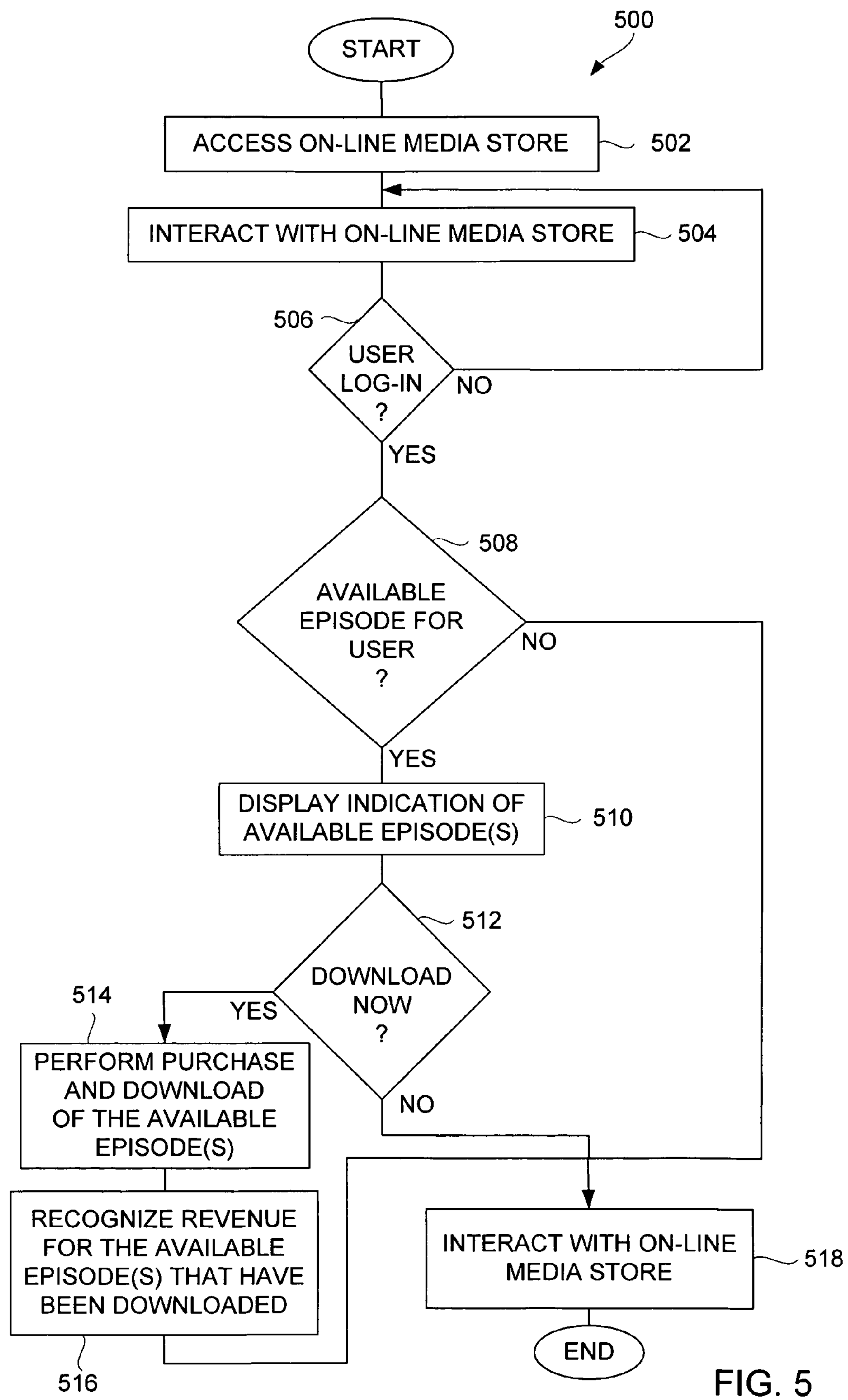
FIG. 5 is a flow diagram of an episode delivery process according to one embodiment of the invention.

FIG. 5 is a flow diagram of an episode delivery process 500 according to one embodiment of the invention. The episode delivery process 500 concerns the eventual purchase and delivery of episodes of a media season to requesting users that have previously purchased the media season.

The episode delivery process 500 initially involves access 502 to an on-line media store. Typically, a user gains access 502 to the on-line media store via a data network, such as the Internet. After the user has access 502 to the on-line media store, the user can interact 504 with the on-line store. Certain interactions with the on-line media store, such as purchasing and downloading, require that the user be a registered user. In this regard, the on-line media store requires that a user log in to authenticate that the user is indeed a registered user of the on-line media store. Hence, when the interaction 504 requires such login, a decision 506 determines whether the user has successfully logged in to the on-line media store. When the decision 506 determines that the user has not yet logged in, then the episode delivery process 500 returns to repeat the operation 504 for other interaction with the on-line media store.

On the other hand, when the decision 506 determines that the user has successfully logged-in, a decision 508 determines whether there are any available episodes for the user. When the decision 508 determines that there are one or more available episodes for the user, an indication of the one or more available episodes is displayed 510 for the user. For example, a dialog box can be presented on a display screen that the user is able to view. The dialog box can list the one or more available episodes and allow the user to initiate download of the one or more available episodes.

Thereafter, a decision 512 determines whether the user desires to download the one or more available episodes at this time. When the decision 512 determines that the user does desire to download one or more of the available episodes, download of one or more of the available episodes is performed 514. Also, the revenue associated with the one or more of the available episodes that have been downloaded can then be recognized 516. Alternatively, when the decision 512 determines that none of the available episodes are to be downloaded, the operations 514 and 516 are bypassed. In this case, the user can choose to either defer the download of the one or more available episodes or cancel the media season. Following the decision 512 when download is not performed, or following the operation 516 following download and revenue recognition, additional interaction 518 with the on-line media store can be provided for the user. Additionally, following the decision 508 when there are no available episodes for the user, the episode delivery process 500 bypasses the operations 510-516 and proceeds to permit the additional interaction 518 with the on-line media store. Eventually, when no further interaction 518 with the on-line media store is desired, the episode delivery process 500 ends.

Figure 6:
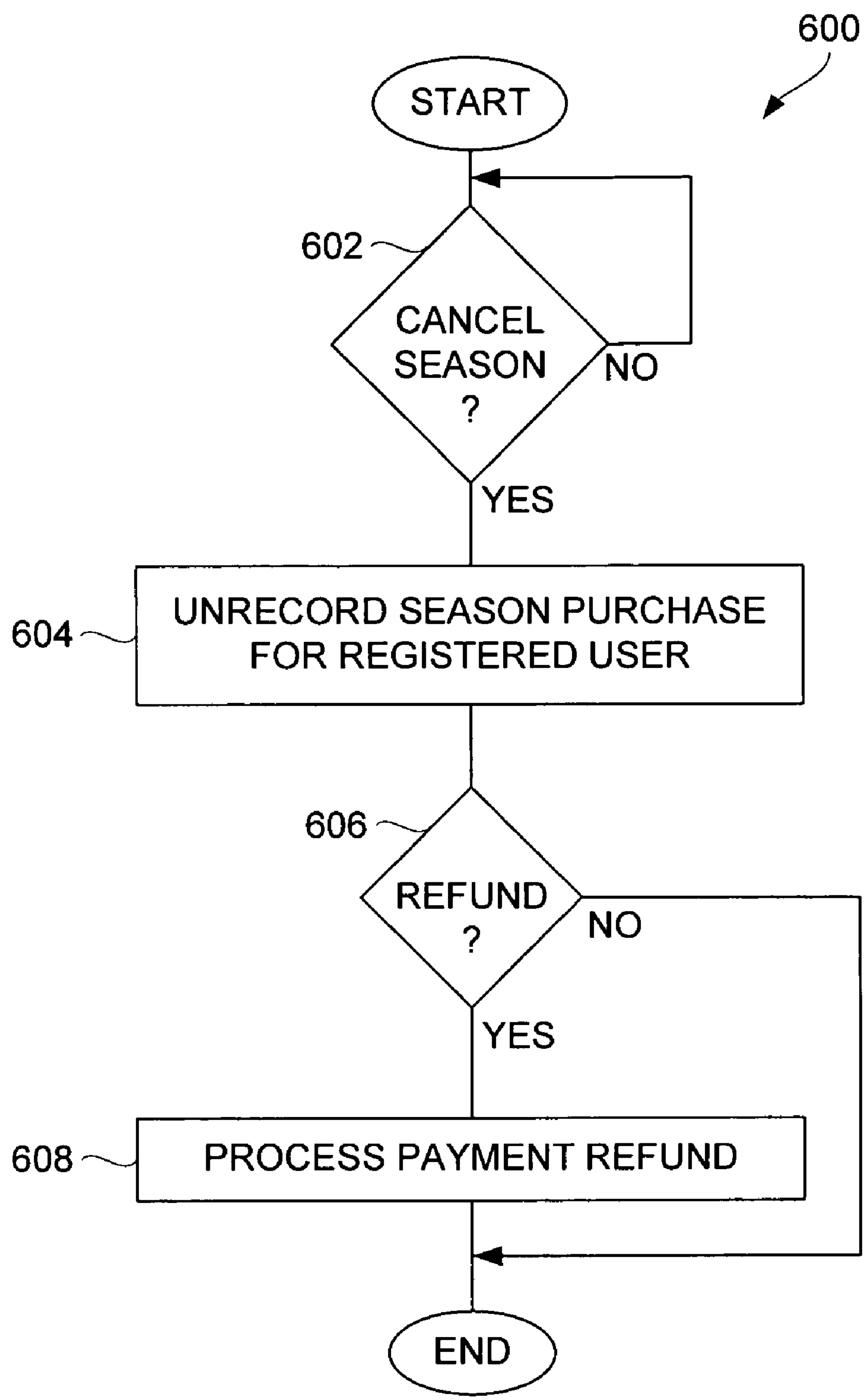
FIG. 6 is a flow diagram of a season cancellation process according to one embodiment of the invention.

In addition, even after a media season has been purchased, the purchaser (i.e., registered user) can subsequently cancel the media season. FIG. 6 is a flow diagram of a season cancellation process 600 according to one embodiment of the invention. The season cancellation process 600 begins with a decision 602 that determines whether a media season is to be cancelled. When the decision 602 determines that the media season is not to be cancelled, then the season cancellation process 600 is effectively not invoked. On the other hand, when the decision 602 determines that the media season is to be cancelled, the season cancellation process 600 is invoked and processing continues. When the processing continues, the season purchase for the registered user is unrecorded 604. For example, the previous indication recorded to the recorded users 210 within the media season management system 200 illustrated in FIG. 2A can be removed so that the system no longer acknowledges that the registered user is the purchaser of the associated media season. In addition, a decision 606 can determine whether a refund is due to the registered user. Typically, the user is charged for the episodes that the user has received. In which case, a refund may not be due to the registered user. However, in other cases, the user may be permitted to get a refund even though they cancel a previously purchased media season. Hence, the decision 606 determines whether a refund is due to the registered user. When the decision 606 determines that a refund is due to the registered user, a payment refund can be processed 608 so that the registered user receives the appropriate refund. On the other hand, when the decision 606 determines that a refund is not due, the block 608 is bypassed. Following the block 608, or its being bypassed, the season cancellation process 600 ends.

Additionally, a season management page can be made available to a user. The season management page can allow the user to view status, cancel or otherwise manage any of the media seasons that they may have purchased. For example, the season management page could display a list of active media seasons that are associated with the user (e.g., associated with a user's account with the on-line media store). Then, through interaction with the season management page, the user can cancel one or more of the media seasons. The user might also be able to check the status of the media seasons. Once one of the media seasons is completed or fulfilled (e.g., all episodes downloaded), the media season is completed and can be removed from the list of active media seasons and, if desired, can be added to a list of completed media seasons and/or a purchase history page that is also available to the user.

Figure 7:
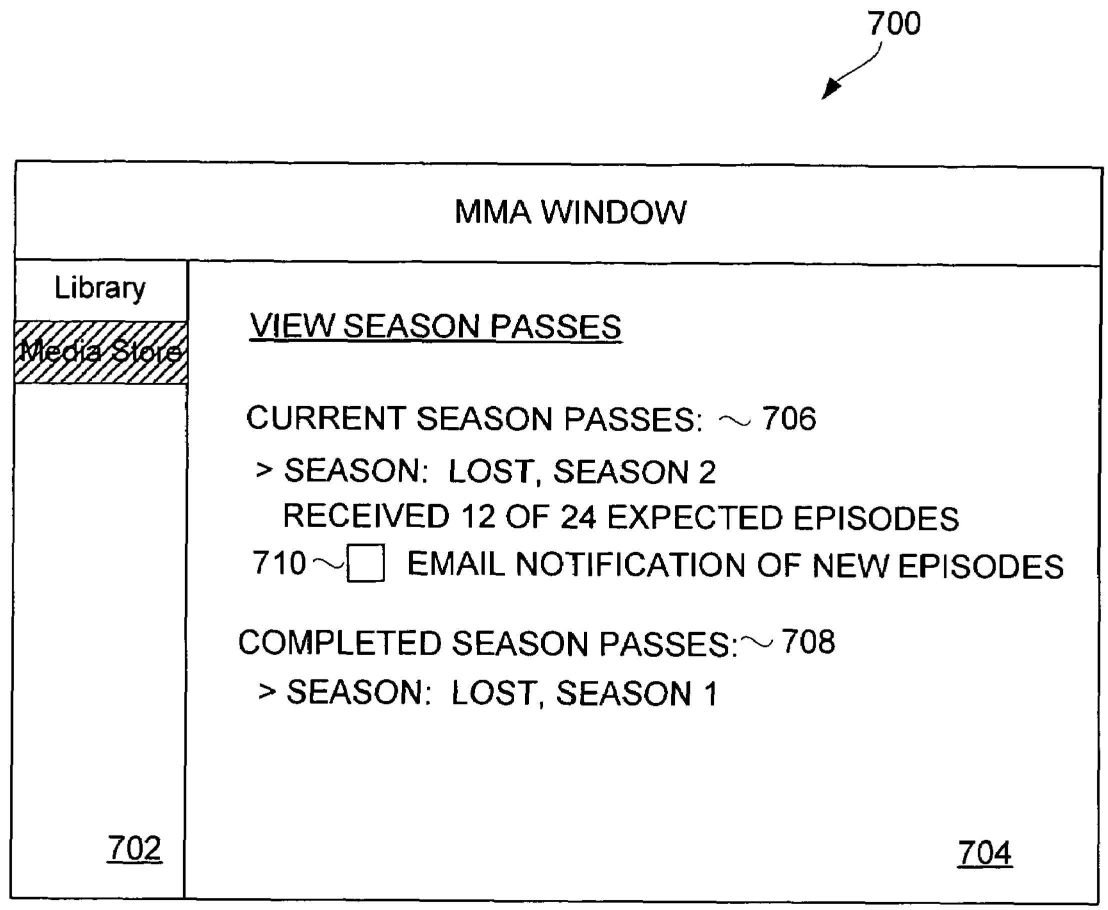
FIG. 7 is a representative season status window according to one embodiment of the invention.

FIG. 7 is a representative season status window 700 according to one embodiment of the invention. The season status window 700 allows a user to receive status information regarding media seasons they have previously purchased. In particular, the season status window 700 includes a media source portion 702 and a media status portion 704. The media source portion 702 indicates the media source for the information presented in the media status portion 704. As shown in FIG. 7, the media source portion 702 indicates that the media source is a "Media Store," namely, the on-line media store. The media status portion 704 includes media season status information. The media season status information presented in the media status portion 704 includes current season passes 706 and completed season passes 708. A season pass corresponds to a media season. For each of the season passes, the seasons that have been purchased can be identified as well as an indication of the extent to which the season has been provided. In addition, a user interface control 710 (e.g., check-box) can be presented so that email notifications of new episodes can be enabled or disabled.

Figure 8:
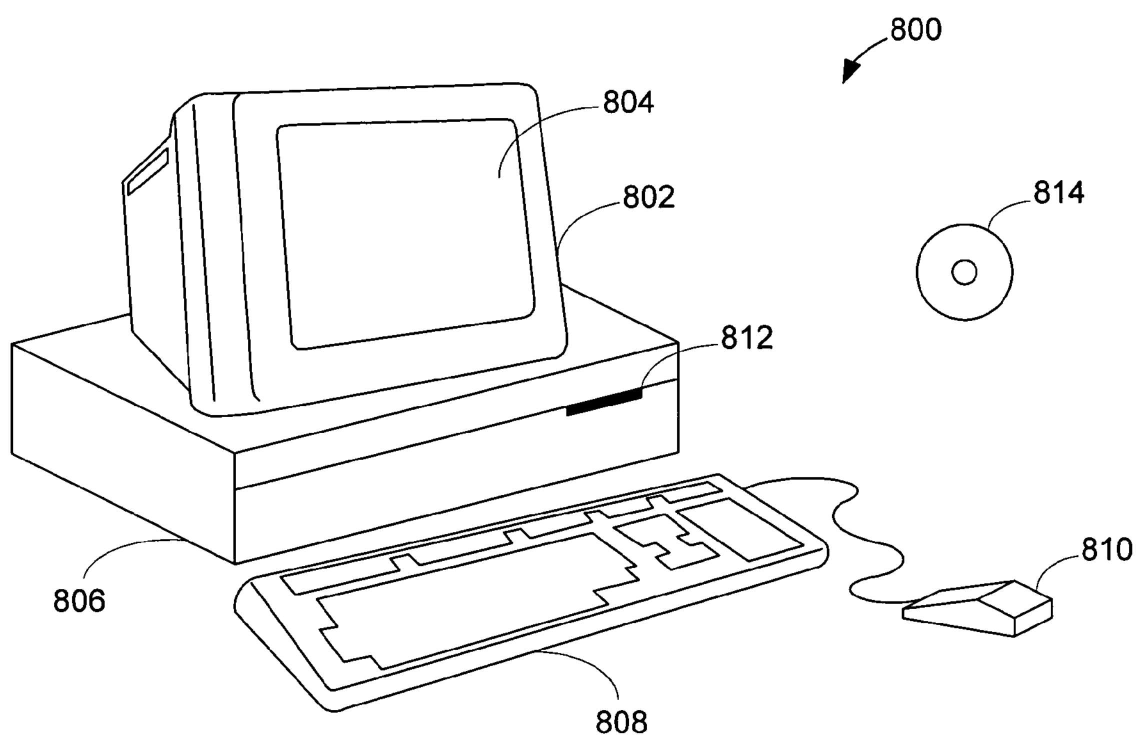
FIG. 8 shows an exemplary computer system suitable for use with the invention.

FIG. 8 shows an exemplary computer system 800 suitable for use with the invention. Although the client device need not be a personal computer, the client device can be the exemplary computer system 800 illustrated in FIG. 8. The computer system 800 includes a display monitor 802 having a single or multi-screen display 804 (or multiple displays), a cabinet 806, a keyboard 808, and a mouse 810. The cabinet 806 houses a processing unit (or processor), system memory and a hard drive (not shown). The cabinet 806 also houses a drive 812, such as a CD-ROM or floppy drive. The drive 812 can also be a removable hard drive, a Flash or EEPROM device, etc. Regardless, the drive 812 may be utilized to store and retrieve software programs incorporating computer code that implements some or all aspects of the invention, data for use with the invention, and the like. Although CD-ROM 814 is shown as an exemplary computer readable storage medium, other computer readable storage media including floppy disk, tape, Flash or EEPROM memory, memory card, system memory, and hard drive may be utilized. Additionally, a data signal embodied in a carrier wave (e.g., in a network) may be the computer readable storage medium. In one implementation, a software program for the computer system 800 is provided in the system memory, the hard drive, the CD-ROM 814 or other computer readable storage medium and serves to incorporate the computer code that implements some or all aspects of the invention.

The digital media assets (i.e., digital media items) can pertain to video items (e.g., video files or movies), audio items (e.g., audio files or audio tracks, such as for songs (music) or audiobooks), or image items (e.g., photos). The digital media assets can also include or be supplemented by text or multimedia files.

The various aspects, features, embodiments or implementations of the invention described above can be used alone or in various combinations.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that seasons of digital media assets can be supported by an on-line media store. Another advantage of the invention is that a season of digital media assets can be purchased and an initial portion of digital media assets of the season delivered, while a remaining portion of digital media assets of the season can be subsequently delivered when they later become available. Another advantage of the invention is that an entire season of digital media assets can be purchased with a single transaction even though the season has not completed. Still another advantage of the invention is that seasons of digital media assets can be managed via an on-line media store.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for acquiring a related series of digital media assets from an on-line media store, said method comprising:

causing related series information pertaining to a plurality of related series of digital media assets that are available for purchase on the on-line media store to be presented on a display of a client device, at least a plurality of the related series having a plurality of episodes associated thereto;

receiving a selection of one of the related series of digital media assets to be purchased;

initiating purchase of the selected one of the related series of digital media assets; and permitting delivery of available ones of the digital media assets of the selected one of the related series of digital media assets from the on-line media store to the client device.

2. The method as recited in claim 1, wherein the selected one of the related series of digital media assets includes a plurality of episodes of a show.

3. The method as recited in claim 1, wherein the selected one of the related series of digital media assets pertains to a show.

4. The method as recited in claim 3, wherein the selected one of the related series of digital media assets consists of a predetermined number of consecutive episodes of the show.

5. The method as recited in claim 3, wherein the selected one of the related series of digital media assets includes those episodes of the show corresponding to a particular media season.

6. The method as recited in claim 3, wherein the show is a television show.

7. The method as recited in claim 1, wherein the selected one of the related series of digital media assets includes episodes containing audiovisual content pertaining to a show.

8. The method as recited in claim 1, wherein the selected one of the related series of digital media assets includes episodes containing audiovisual content regarding highlights of one or more events, shows, or programs.

9. The method as recited in claim 8, wherein the highlights correspond to a particular media season.

10. The method as recited in claim 1, wherein at the time the purchase is initiated, none or only a portion of the digital media assets of the selected one of the related series of digital media assets are available.

11. The method as recited in claim 1, wherein when the related series of digital media assets are available on the on-line music store, the number of digital media assets to be included in the related series of digital media assets is known or estimated.

12. The method as recited in claim 1, wherein as one or more other of the digital media assets within the selected one of the related series of digital media assets become available, the one or more other of the digital media assets are made available to or provided to the client device.

13. The method as recited in claim 1, wherein the delivery involves downloading to the client device.

14. The method as recited in claim 1, wherein at the time of purchase only a portion of the digital media assets within the selected one of the related series of digital media assets are available.

15. The method as recited in claim 14, wherein at the time of purchase, the cost applied to a user account is a pro-rata amount of a total series cost.

16. The method as recited in claim 15, wherein the pro-rata amount of the total series cost is determined dependent on (i) the number of digital media assets within the selected one of the related series of digital media assets that are available at the time of purchase and (ii) the total number of digital media assets expected in the related series of digital media assets.

17. The method as recited in claim 15, wherein, as other of the digital media assets within the selected one of the related series of digital media assets subsequently are made available, an additional portion of the total series cost is applied to the user account.

18. The method as recited in claim 1, wherein the purchase of the selected one of the related series of digital media assets is at a total series cost, and wherein the total series cost is less than the sum of the individual costs of all the digital media assets, including available and expected, within the selected one of the related series of digital media assets.

19. The method as recited in claim 1, wherein said method further comprises:

determining whether one or more other of the digital media assets within the selected one of the related series of digital media assets have subsequently been made available; and sending an electronic notification to the client device or its user that the one or more other of the digital media assets within the selected one of the related series of digital media assets have subsequently been made available.

20. The method as recited in claim 1, wherein said method further comprises:

subsequently receiving a request to cancel the purchase of a remaining portion of the selected one of the related series of digital media assets.

21. The method as recited in claim 20, wherein said method further comprises:

processing at least a partial refund for the related series of digital media assets so long as not all of the digital media assets within the selected one of the related series of digital media assets have not been made available or delivered.

22. The method as recited in claim 1, wherein the digital media assets include audiovisual content.

23. The method as recited in claim 22, wherein the audiovisual content is a video or movie.

24. The method as recited in claim 1, wherein the purchase is performed by an electronic payment.

25. The method as recited in claim 1, wherein said method further comprises:

processing at least a partial electronic payment for the purchase of the selected one of the related series of digital media assets after completion of delivery of one or more of the digital media assets of the selected one of the related series of digital media assets.

26. A computer readable medium including at least computer program code for acquiring a related series of digital media assets from an on-line media store, said computer readable medium comprising:

computer program code for presenting related series information pertaining to a plurality of related series of digital media assets that are available for purchase on the online media store, at least a plurality of the related series having a plurality of episodes associated thereto;

computer program code for receiving a selection of one of the related series of digital media assets to be purchased;

computer program code for initiating purchase of the selected one of the related series of digital media assets; and computer program code for permitting delivery of available ones of the digital media assets of the selected one of the related series of digital media assets.

27. The computer readable medium as recited in claim 26, wherein the selected one of the related series of digital media assets includes episodes containing audiovisual content regarding highlights of one or more events, shows, or programs.

28. The computer readable medium as recited in claim 27, wherein said computer readable medium further comprises:

computer program code for determining whether one or more other of the digital media assets within the selected one of the related series of digital media assets have subsequently been made available; and computer program code for sending an electronic notification to the client device or its user that the one or more other of the digital media assets within the selected one of the related series of digital media assets have subsequently been made available.

29. The computer readable medium as recited in claim 28, wherein at the time of purchase only a portion of the digital media assets within the selected one of the related series of digital media assets are available, wherein at the time of purchase, the cost applied to a user account is a pro-rata amount of a total series cost, the pro-rata amount of the total series cost being determined dependent on (i) the number of digital media assets within the selected one of the related series of digital media assets that are available at the time of purchase and (ii) the total number of digital media assets expected in the related series of digital media assets, and wherein, as other of the digital media assets within the selected one of the related series of digital media assets subsequently are made available, an additional portion of the total series cost is applied to the user account.

30. The computer readable medium as recited in claim 29, wherein the total series cost is less than the sum of the individual costs of all the digital media assets, including available and expected, within the selected one of the related series of digital media assets.

31. A media server, comprising:

at least one data storage device, said data storage device storing (i) season product information that contains characteristics on a plurality of related series, (ii) related series information, the related series, information relates a plurality of episodes to each of the plurality of related series, and (iii) the plurality of episodes or pointers thereto; and a data processing unit operatively connected to said at least one data storage device, said data processing unit performing a purchase process to enable users to select one or more of the related series for purchase, said data processing unit further performing a fulfillment process to deliver, to the user that has purchased such, the episodes for the purchased one of more of the related series as they become available.

32. The media system as recited in claim 31, wherein said media server further comprises:

an import engine for receiving episodes from media content providers, the episodes include media content and descriptive information, wherein using the descriptive information, each of the received episodes can be automatically added to the data storage device in a manner so as to correspond to the appropriate related series.

* * * * *

UNITED STATES PATENT AND TRADEMARK OFFICE

CERTIFICATE OF CORRECTION

PATENT NO. : 7,657,459 B2
APPLICATION NO. : 11/370347
DATED : February 2, 2010
INVENTOR(S) : Anderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 972 days.

Signed and Sealed this

Twenty-eighth Day of December, 2010

David J. Kappos

*Director of the United States Patent and Trademark Office*